United States Patent Office 3,025,277
Patented Mar. 13, 1962

3,025,277
COPOLYMERS COMPRISED OF ALIPHATIC CONJUGATED DIETHYLENICALLY UNSATURATED COMPOUNDS AND BETA-TRICHLOROSTYRENE
George B. Sterling, Midland, Mich., assignor to The Dow Chemical Company, Midland, Mich., a corporation of Delaware
No Drawing. Filed June 30, 1958, Ser. No. 745,265
16 Claims. (Cl. 260—80.7)

This invention concerns new copolymers containing aliphatic conjugated diethylenically unsaturated organic compounds and beta-trichlorostyrene chemically combined in the copolymer molecule. It relates more particularly to elastomeric copolymers of conjugated diolefins or chloro-derivatives thereof with beta-trichlorostyrene, and pertains to polymers of such compounds and one or more other monoethylenically unsaturated organic compounds and a method of making the copolymers.

It is known to prepare rubbery copolymers of conjugated diolefins and monoethylenically unsaturated organic compounds, e.g. styrene or acrylonitrile, by polymerizing a mixture of the monomers in an aqueous emulsion. In many instances the product can be sheeted out on rolls or compounded with other ingredients, e.g. fillers, only with difficulty. It is common practice to employ a modifier, e.g. mercaptans, in the polymerization to regulate or control the molecular weight of the polymer and improve the plasticity of the product.

It has been discovered that copolymers containing aliphatic conjugated diethylenically unsaturated organic compounds, e.g. butadiene, isoprene, chloroprene, or chloroisoprene, and beta-trichlorostyrene chemically combined in the copolymer molecule and copolymers of mixtures of such monomeric compounds and one or more other monoethylenically unsaturated organic compounds copolymerizable therewith, in proportions as hereinafter defined, are elastomeric products possessing valuable rubber-like properties and are of excellent softness and plasticity. It has further been found that the beta-trichlorostyrene not only enters into the copolymerization reaction and is chemically combined in the copolymer product, but also has a pronounced action for modifying the polymerization and regulating the molecular weight of the copolymer that is formed.

The aliphatic conjugated diethylenically unsaturated organic compound to be employed in preparing the copolymers of the invention can be a conjugated diolefin or a derivative thereof having the general formula:

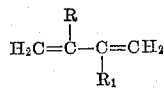

wherein R represents a member of the group consisting of hydrogen, chlorine and the methyl radical and $R_1$ represents a member of the group consisting of hydrogen and the methyl radical. Examples of such compounds are butadiene, isoprene, dimethyl-butadiene, chloroprene, and 2-chloro-3-methyl-butadiene. Mixtures of any two or more of the conjugated diethylenically unsaturated compounds can also be used. The conjugated diethylenically unsaturated compound can be employed in amount corresponding to from 30 to 95 percent by weight of the mixture of monomers to be polymerized.

In general, when binary copolymers of one or more of the conjugated diethylenically unsaturated aliphatic monomers and beta-trichlorostyrene are prepared, the starting monomers are employed in amounts corresponding to from 30 to 95 percent by weight of the conjugated aliphatic monomer and from 70 to 5 percent of the beta-trichlorostyrene. Such monomer mixtures produce copolymers containing from about 3 to 55 percent by weight of the beta-trichlorostyrene chemically combined or interpolymerized with the conjugated aliphatic diethylenically unsaturated monomer in the copolymer product. When preparing copolymers from mixtures of one or more of the conjugated aliphatic diethylenically unsaturated monomers, the beta-trichlorostyrene and one or more other monoethylenically unsaturated organic compounds copolymerizable therewith, the monomers are preferably employed in proportions corresponding to from 40 to 80 percent by weight of the conjugated diethylenically unsaturated monomer, from 5 to 40 percent by weight of the beta-trichlorostyrene and from 5 to 40 percent by weight of the other monoethylenically unsaturated monomer. Such monomer mixtures yield copolymers containing from about 3 to about 35 percent by weight of the beta-trichlorostyrene chemically combined in the copolymer product.

The beta-trichlorostyrene can be beta-2,3-trichlorostyrene, beta-2,4-trichlorostyrene or beta-2,5-trichlorostyrene or mixtures of the isomeric beta-trichlorostyrenes. The beta-trichlorostyrene can be employed in amount corresponding to from 5 to 70 preferably from 5 to 40 percent by weight of the monomer mixture, the balance being composed of from 5 to 40 percent by weight of one or more other monoethylenically unsaturated organic compounds copolymerizable therewith, based on 100 parts by weight of the total monomer starting materials.

The beta-trichlorostyrene can be prepared by procedure described in U.S. Patent No. 2,803,675. In brief, beta-trichlorostyrene can be prepared by reacting dichlorostyrene with chlorine in an inert liquid diluent by contacting the dichlorostyrene with a strongly acidic aqueous composition in which nascent chlorine is generated by chemical reaction such as by the action of mineral acids on mixtures of inorganic salts comprising the inorganic chlorides, chlorates or hypochlorites. More specifically, beta-dichlorostyrene can be prepared by adding to a liquid mixture of dichlorostyrene and an inert diluent, e.g. dichloroethylbenzene, separate streams of aqueous concentrated hydrochloric acid and an aqueous 15 to 20 percent solution of sodium chlorate at temperatures between 25° and 40° C. and thereafter separating the beta-trichlorostyrene from the reacted mixture.

The other monoethylenically unsaturated organic compound to be employed in preparing the copolymers of the invention can be a monovinyl aromatic hydrocarbon of the benzene series or a nuclear halogenated derivative thereof such as styrene, vinyltoluene, vinylxylene, ethylvinylbenzene, isopropylstyrene, chlorostyrene, dichlorostyrene, fluorostyrene, or the like; an unsaturated ketone such as methyl vinyl ketone or methyl isopropenyl ketone; a vinyl ether such as ethyl vinyl ether, butyl vinyl ether; a vinyl ester such as vinyl acetate, vinyl propionate or vinyl stearate; an ester of acrylic acid or methacrylic acid such as the methyl, ethyl, propyl, butyl, hexyl or 2-ethylhexyl esters of acrylic acid or the methyl, ethyl or butyl esters of methacrylic acid; or acrylonitrile. Such monomers are employed in amounts of from 5 to 40 percent by weight of the total monomeric compounds initially used.

The copolymerization of the monomers can be carried out in the presence or absence of solvents or liquid diluents, but is advantageously and preferably carried out in an aqueous emulsion of the copolymerizable monomeric compounds to obtain the copolymer in the form of a synthetic latex or an aqueous colloidal dispersion of the copolymer. The polymerization reaction can be carried out at temperatures between about 0° and 100° C., preferably from 5° to 80° C., in the presence of a polymerization catalyst and at superatmospheric pressure, suitably under the autogenous pressure of the mixture of the materials at the temperatures employed, although greater pressures can be used. Suitable polymerization catalysts are peroxy compounds such as lauroyl peroxide, benzoyl peroxide, tert.-butyl hydroperoxide, di-tert.-butylperoxide, cumene hydroperoxide, diisopropylbenzene peroxide, hydrogen peroxide, di-tert.-butyl perbenzoate, di-tert.-butyl diperphthalate or the per salts such as potassium persulfate, sodium persulfate, ammonium persulfate and the like. The polymerization catalyst material is usually employed in amount corresponding to from 0.1 to 5, preferably from 0.5 to 2 percent by weight of the monomers to be polymerized.

The aqueous emulsion is usually prepared so as to contain a total of from 10 to 50, preferably from 25 to 50 percent of the polymerizable monomers. The polymerization is preferably carried out in an aqueous alkaline emulsion employing a per-salt, e.g. potassium persulfate, as the catalyst in the proportion just mentioned, together with a small proportion, e.g. from 0.5 to 2 percent based on the weight of the monomers, of an alkali such as sodium or potassium carbonate or bicarbonate or a corresponding hydroxide to render the mixture slightly alkaline, and an emulsifying agent in amount sufficient to form a stable emulsion. Any of a variety of well-known emulsifying agents can be used in preparing the emulsions. Examples of suitable emulsifying agents are Duponol WAQ (fatty alcohol sodium sulfate), Aerosal MA (dihexyl sodium sulfosuccinate), Nacconol NRSF (alkylbenzene sodium sulfonate), Triton X-200 (sodium salt of alkyl aryl polyether sulfonate) or Dresinate 214 (potassium salt of diproportionated rosin acids). The emulsifying agents are usually employed in amounts corresponding to from 1 to 5 percent by weight of the monomers to be polymerized.

In a typical procedure the emulsifying agent, together with the alkali, e.g. sodium bicarbonate, and the polymerization catalyst, if water soluble such as potassium persulfate, is dissolved in water in a suitable pressure resistant vessel equipped with a stirrer and means for heating or cooling the contents. Thereafter, the monomers are added, or the monomers containing the polymerization catalyst if the latter is oil-soluble, are added in the desired proportions. The resulting mixture is vigorously agitated to effect emulsification, after which the mixture is heated and stirred with mild agitation at temperatures as herein stated, preferably at temperatures between 5° and 80° C. until the copolymerization reaction is complete, e.g. until the monomers are polymerized or substantially polymerized.

The copolymer product can be recovered from the latex in usual ways, e.g. by freezing or by mixing coagulating agents such as acids or water soluble salts such as sodium chloride, calcium chloride, aluminum sulfate, hydrochloric acid, sulfuric acid or the like with the latex. The coagulated material is separated by filtering and is washed and dried. The latex is usually mixed with a small amount of an antioxidant or stabilizer such as 2,6-di-tert.-butyl-4-methylphenol or 2,4-dimethyl-6-(2-methylcyclohexyl)phenol in amount corresponding to from 1 to 5 percent by weight of the copolymer, and suitably dispersed in an aqueous emulsion, prior to coagulating the latex and recovering the copolymer. The latex is preferably subjected to steam distillation, e.g. by bubbling steam therethrough at a temperature of about 100° C. and at atmospheric pressure or thereabout, to distill and separate unreacted monomers prior to coagulating the latex to recover the copolymer.

The copolymers of the invention range from soft tacky semi-liquid elastomers to solid rubbery materials possessing excellent softness and good plasticity, depending in part upon the proportion of beta-trichlorostyrene chemically combined therein. In general, the copolymers containing the larger proportions of beta-trichlorostyrene within the range hereinafter stated are tacky semi-liquid to soft solids, whereas the copolymers containing the smaller proportions of chemically combined beta-trichlorostyrene are solid rubbery copolymers possessing excellent plasticity. The copolymers are useful for a variety of purposes.

The soft copolymers can be dissolved in a solvent such as benzene, toluene, methyl ethyl ketone, ethylene dichloride or the like to form solutions which are useful as adhesives and which can be applied to tape, paper, cloth, etc., for sealing packages, or the copolymers can be mixed with fillers such as clay, asbestos shorts, drying oils and a solvent to form a dough-like putty, suitable for sealing cracks, crevices, joints and the like to make them waterproof.

The solid copolymers of the invention possess excellent softness and plasticity and are readily compounded with carbon black, sulfur, accelerators, fillers and other usual rubber-compounding agents and cured to obtain vulcanized rubbery products having good mechanical properties, e.g. tensile strength, elongation and resistance to abrasion. The cured rubber products are useful for a variety of purposes.

The copolymers can be incorporated with thermoplastic resins to provide compositions possessing improvement in one or more of the properties impact strength or percent elongation.

The following examples illustrate ways in which the principle of the invention has been applied, but are not to be construed as limiting its scope.

EXAMPLE 1

A rubbery polymer was prepared by polymerizing a mixture of monomers in an aqueous emulsion employing the following recipe:

| | Parts by weight |
|---|---|
| Butadiene-1,3 | 40 |
| Methyl isopropenyl ketone | 5 |
| Acrylonitrile | 5 |
| Styrene | 5 |
| Isoprene | 10 |
| Ethyl acrylate | 5 |
| Ethyl vinyl ether | 5 |
| Dichlorostyrene | 5 |
| beta-Trichlorostyrene | 20 |
| Water | 123 |
| Duponol WAQ (fatty alcohol sodium sulfate) | 0.85 |
| Tert.-dodecyl mercaptan | 0.5 |
| Potassium persulfate | 0.75 |
| Sodium bicarbonate | 1 |

The mixture was placed in a pressure-resistant vessel and vigorously agitated to effect emulsification, then heated at a temperature of 60° C. with mold agitation for a period of 24 hours to polymerize the monomers. Thereafter, the vessel and contents were cooled. The polymer was obtained as a synthetic latex. The conversion was 98 percent. The latex was steam distilled to remove unreacted monomers. Thereafter, there was added to the latex 4 parts by weight of 2,4-dimethyl-6-(2-methylcyclohexyl)phenol as stabilizer, based on the weight of the copolymer. The polymer was recovered by coagulating the latex, washing the wet material and drying the latter in an oven under reduced pressure. The copolymer contained 18 percent beta-trichlorostyrene by analysis. A portion of the copolymer was compounded with added ingredients employing the recipe:

| Ingredients: | Parts by weight |
|---|---|
| Copolymer | 100 |
| Carbon black | 20 |
| Zinc oxide | 5 |
| Sulfur | 1.5 |
| Steric acid | 1 |
| Altax (benzothiazyl disulfide) | 1 |

The ingredients were milled together on cold rolls to form a homogeneous composition, then rolled into a sheet ⅛-inch thick and cured under pressure at a temperature of 298° F. for 30 minutes. The cured rubber product had the properties:

| | |
|---|---|
| Tensile strength | 220 lbs./sq.in. |
| Elongation | 375 percent. |
| Shore hardness A | 45. |
| Shore hardness C | 30. |

A rubber product was prepared by compounding a portion of the polymer with added ingredients employing the recipe:

| Ingredients: | Parts by weight |
|---|---|
| Copoylmer | 100 |
| Carbon black | 40 |
| Zinc oxide | 5 |
| Sulfur | 1.5 |
| Stearic acid | 1 |
| Altax (benzothiazyl disulfide) | 1 |

The mixture was compounded on cold rolls, then rolled into a sheet ⅛-inch thick and cured under pressure at a temperature of 298° F. for 30 minutes. The cured rubber product had the properties:

| | |
|---|---|
| Tensile strength | 1860 lbs./sq.in. |
| Elongation | 325 percent. |
| Shore hardness A | 67. |
| Shore hardness C | 30. |

EXAMPLE 2

In each of a series of experiments, a rubbery copolymer was prepared by polymerizing a mixture of monomers consisting of ar,ar,beta-trichlorostyrene, butadiene and another monoethylenically unsaturated organic monomer in proportions and kind as stated in the following table, in an aqueous emulsion. The ar,ar,beta-trichlorostyrene employed in the experiments was a mixture of isomeric compounds obtained as a fraction boiling at 70°–76° C. at 0.4 millimeter absolute pressure and consisted of 67 percent by weight of beta-2,5-trichlorostyrene, 30 percent of beta-2,4-trichlorostyrene, about one percent of beta-2,3-trichlorostyrene and about 2 percent of ar-dichlorostyrene, as determined by infrared analysis. The recipe and procedure for making the copolymer was as follows:

| Ingredients: | Parts by weight |
|---|---|
| Monomers | 100 |
| Water | 123 |
| Duponol WAQ (fatty alcohol sodium sulfate) | 0.85 |
| Tert.-dodecyl mercaptan | 0.5 |
| Potassium persulfate | 0.75 |
| Sodium bicarbonate | 1.0 |

The sodium bicarbonate, potassium persulfate, Duponol WAQ and water were placed in a pressure-resistant vessel and the monomers and tert.-dodecyl mercaptan were added. The mixture was vigorously agitated in the closed vessel to effect emulsification, then was heated with mild stirring at a temperature of 60° C. for a period of 24 hours to polymerize the monomers. The polymerization was continued until complete or substantially complete. Thereafter, the pressure was released. The mixture was removed from the reaction vessel as a synthetic latex. The latex was steam distilled by heating the same to a temperature of about 100° C. and bubbling steam therethrough to distill and remove unreacted monomers from the latex. A weighed portion of the stripped latex was analyzed to determine the percent of copolymer therein. Thereafter, an aqueous emulsion containing 3 percent by weight, based on the weight of the copolymer, of 2,4-dimethyl-6-(2-methylcyclohexyl)phenol, as stabilizer was mixed with the main portion of the latex. The copolymer was recovered by coagulating the latex, separating, washing and drying the coagulum in a vacuum over at a temperature of 60° C. at an absolute pressure between 5 and 10 millimeters.

The copolymers prepared above were compounded with added ingredients employing the recipe:

| Ingredients: | Parts by weight |
|---|---|
| Copolymer | 100 |
| Carbon black | 40 |
| Zinc oxide | 5 |
| Sulfur | 2 |
| Stearic acid | 1 |
| Altax (benzothiazyl disulfide) | 1 |

The ingredients were compounded on cold rolls to a uniform composition, then rolled into a sheet ⅛-inch thick and cured under pressure at a temperature of 298° F. for a period of 30 minutes. Test pieces were cut from the cured sheet of the rubber product. The test pieces were used to determine the tensile strength and percent elongation for the cured rubber product employing procedures similar to those described in ASTM D412–51T. Hardness was determined by procedure similar to that described in ASTM D676–47T. Table I identifies the copolymer by giving the proportions of the monomers employed in preparing the same. The table gives the percent yield or percent of polymerization of the monomers and the percent of beta-trichlorostyrene chemically combined in the copolymer product as determined by analysis. The table also gives the properties determined for the cured rubber product.

Table I

| Run No. | Starting materials | | | | Polymerizing conditions | | Copolymer | | Cured product | | | |
|---|---|---|---|---|---|---|---|---|---|---|---|---|
| | Butadiene, percent | Betatrichloro styrene, percent | Other monomer | | Temp., °C. | Time, hrs. | Yield, percent | Betatrichloro styrene, percent | Tensile strength, lbs./sq. in. | Elongation, percent | Shore hardness | |
| | | | Kind | Percent | | | | | | | A | C |
| 1 | 80 | 5 | Acrylonitrile | 15 | 60 | 24 | 100 | 3.4 | 720 | 100 | 75 | 40 |
| 2 | 70 | 15 | do | 15 | 60 | 24 | 100 | 15.8 | 780 | 200 | 72 | 35 |
| 3 | 60 | 20 | do | 20 | 60 | 24 | 100 | 17.6 | 1,550 | 250 | 75 | 36 |
| 4 | 40 | 40 | do | 20 | 60 | 24 | 100 | 31.7 | 1,600 | 275 | 77 | 35 |
| 5 | 80 | 5 | Styrene | 15 | 60 | 24 | 100 | 5.4 | 980 | 250 | 72 | 32 |
| 6 | 70 | 15 | do | 15 | 60 | 24 | 96 | 10.0 | 1,030 | 325 | 70 | 30 |
| 7 | 60 | 20 | do | 20 | 60 | 24 | 90 | 13.1 | 700 | 250 | 65 | 24 |
| 8 | 40 | 40 | do | 20 | 60 | 24 | 92 | 30.3 | 460 | 250 | 61 | 22 |
| 9 | 80 | 5 | Methyl isopropenyl ketone | 15 | 60 | 24 | 100 | 3.4 | 1,150 | 225 | 73 | 32 |
| 10 | 60 | 20 | do | 20 | 60 | 24 | 97 | 14.4 | 1,360 | 400 | 70 | 31 |
| 11 | 40 | 40 | do | 20 | 60 | 24 | 95 | 28.8 | 1,540 | 375 | 67 | 25 |
| 12 | 80 | 5 | Ethyl acrylate | 15 | 60 | 24 | 100 | 3.8 | 840 | 150 | 74 | 35 |
| 13 | 60 | 20 | do | 20 | 60 | 24 | 97 | 15.3 | 1,040 | 250 | 69 | 30 |
| 14 | 40 | 40 | do | 20 | 60 | 24 | 95 | 31.4 | 920 | 200 | 66 | 26 |
| 15 | 80 | 5 | Vinyltoluene | 15 | 60 | 24 | 100 | 5.2 | 1,170 | 250 | 71 | 32 |
| 16 | 60 | 20 | do | 20 | 60 | 24 | 100 | 17.8 | 1,200 | 350 | 65 | 25 |
| 17 | 80 | 5 | Dichlorostyrene | 15 | 60 | 24 | 100 | 3.8 | 840 | 175 | 73 | 33 |
| 18 | 60 | 20 | do | 20 | 60 | 24 | 97 | 15.0 | 1,290 | 300 | 69 | 29 |
| 19 | 40 | 40 | do | 20 | 60 | 24 | 90 | 30.6 | 1,030 | 375 | 60 | 23 |

EXAMPLE 3

In each of a series of experiments a copolymer was prepared by polymerizing a mixture of 60 percent by weight of chloroisoprene, 20 percent of ar, ar-beta-trichlorostyrene similar to that employed in Example 2, and 20 percent of another monomer as identified in the following table, in an aqueous emulsion employing the recipe and procedures employed in Example 2. The copolymer was compounded with other ingredients employing the recipe and procedures described in Example 2 to form a test composition. Table III identifies the copolymer and gives the properties determined for the cured product.

Tablet III

| Run No. | Starting materials | | | | Polymerizing conditions | | Copolymer | | Cured product | | | |
|---|---|---|---|---|---|---|---|---|---|---|---|---|
| | Isoprene, percent | Betatrichloro styrene, percent | Other monomer | | Temp., °C. | Time, hrs. | Yield, percent | Betatrichloro styrene, percent | Tensile strength, lbs./sq. in. | Elongation, percent | Shore hardness | |
| | | | Kind | Percent | | | | | | | A | C |
| 1 | 60 | 20 | Vinyl Acetate | 20 | 60 | 48 | 87 | 13.3 | 350 | 300 | 55 | 20 |
| 2 | 60 | 20 | Ethyl Vinyl Ether | 20 | 60 | 48 | 73.5 | 14.5 | 370 | 175 | 62 | 24 |
| 3 | 60 | 20 | Acrylonitrile | 20 | 60 | 24 | 98 | 18.6 | 890 | 100 | 85 | 43 | following table, in an aqueous emulsion employing the recipe and procedures described in Example 2. The copolymer was compounded with other ingredients to form a test composition employing the recipe and procedures employed in Example 2. Table II identifies the copolymers, gives the proportion of beta-trichlorostyrene chemically combined therein and gives the properties determined for the cured product.

EXAMPLE 5

In each of a series of experiments a copolymer was prepared by polymerizing a mixture of 60 percent by weight of butadiene, 20 percent of ar,ar-beta-trichlorostyrene similar to that employed in Example 2, and 20 percent of another monomer as identified in the following table, in an aqueous emulsion employing the recipe Table II

| Run No. | Starting materials | | | | Polymerizing conditions | | Copolymer | | Cured product | | | |
|---|---|---|---|---|---|---|---|---|---|---|---|---|
| | Chloroisoprene, percent | Betatrichloro styrene, percent | Other monomer | | Temp., °C. | Time, hrs. | Yield, percent | Betatrichloro styrene, percent | Tensile strength, lbs./sq. in. | Elongation, percent | Shore hardness | |
| | | | Kind | Percent | | | | | | | A | C |
| 1 | 60 | 20 | Acrylonitrile | 20 | 60 | 24 | 99 | 18 | 1,920 | 200 | 80 | 47 |
| 2 | 60 | 20 | Styrene | 20 | 60 | 24 | 87 | 18 | 1,120 | 250 | 70 | 30 |
| 3 | 60 | 20 | Methyl isopropenyl ketone | 20 | 60 | 24 | 100 | 18 | 1,040 | 325 | 71 | 30 |
| 4 | 60 | 20 | Vinyl acetate | 20 | 60 | 48 | 83 | 20 | 825 | 450 | 52 | 19 |
| 5 | 60 | 20 | Ethyl vinyl ether | 20 | 60 | 48 | 70 | 20 | 815 | 350 | 61 | 25 |

EXAMPLE 4

In each of a series of experiments a copolymer was prepared by polymerizing a mixture of 60 percent by weight of isoprene, 20 percent of ar,ar-beta-trichlorostyrene similar to that employed in Example 2, and 20 percent of another monomer as identified in the following and procedures employed in Example 2. The copolymer was compounded with other ingredients to form a test composition employing the recipe and procedures described in Example 1. Table IV identifies the copolymer and gives the properties determined for the cured product.

Table IV

| Run No. | Starting materials | | | | Polymerizing conditions | | Copolymer | | Cured product | | | |
|---|---|---|---|---|---|---|---|---|---|---|---|---|
| | Butadiene, percent | Beta-trichloro styrene, percent | Other monomer | | Temp., °C. | Time, hrs. | Yield, percent | Beta-trichloro styrene, percent | Tensile strength, lbs./sq. in. | Elongation, percent | Shore hardness | |
| | | | Kind | Percent | | | | | | | A | C |
| 1 | 60 | 20 | Butyl vinyl ether | 20 | 60 | 48 | 82 | 18.4 | 290 | 200 | 56 | 21 |
| 2 | 60 | 20 | Methyl vinyl ketone | 20 | 60 | 24 | 95 | 20.8 | 620 | 200 | 68 | 36 |
| 3 | 60 | 20 | Ethylene glycol mono-methyl-acrylate. | 20 | 60 | 24 | 95 | 12.5 | 650 | 125 | 79 | 38 |
| 4 | 60 | 20 | 2-ethylhexylacrylate | 20 | 60 | 24 | 98 | 18.6 | 530 | 300 | 51 | 26 |

EXAMPLE 6

In each of a series of experiments a mixture of butadiene or isoprene and ar,ar-beta-trichlorostyrene similar to that employed in Example 2, and in proportions as stated in the following table, was polymerized in an aqueous emulsion employing the recipe and procedures employed in Example 2. Table V identifies the copolymer by giving the proportions of monomers from which it was prepared and gives the proportion of beta-trichlorostyrene chemically combined in the copolymer.

In each of a series of experiments, a portion of the copolymer prepared in run Nos. 2, 3 and 4 in Table V above, was compounded with added ingredients to make a calking compound employing the recipe:

| Ingredients: | Parts by weight |
|---|---|
| Copolymer | 20 |
| Clay 33 [1] | 5 |
| Fibrous talc | 30 |
| Asbestos shorts | 15 |
| Boiled linseed oil (Z7—Z8) | 20 |
| Skelly solvent (B.P. 60–100° C.) | 5 |
| Skelly solvent (B.P. 100–140° C.) | 5 |

[1] Clay 33, obtained from Southern Clay Inc. It was a finely divided inert material of a cream color having 38 percent by weight of its particles of sizes below 2 microns and consisted of 43.75 percent by weight of $Al_2O_3$, 54.0 percent $SiO_2$, 0.25 percent $Fe_2O_3$, 0.75 percent $TiO_2$ and 1.25 percent $K_2O.Na_2O$, by analysis.

The ingredients were mixed on compounding rolls at room temperature to form a homogeneous plastic tacky dough. The composition was then tested for flow from a calking gun under hand pressure and for adhesion to wood and metal and for sag. The calking compositions had the properties:

| Test No. | Beta-trichloro styrene in copolymer, percent | Remarks |
|---|---|---|
| A | 34.0 | Guns well, soft, good adhesion, very slight sag, waterproof. |
| B | 45.4 | Guns well, soft, good adhesion, no sag, waterproof. |
| C | 54.0 | Guns well, slightly stiff, good adhesion, no sag, waterproof. |

Table V

| Run No. | Starting materials | | | Polymerizing conditions | | Copolymer | | Remarks |
|---|---|---|---|---|---|---|---|---|
| | Conjugated diolefin | | Beta-trichloro styrene, percent | Temp., °C. | Time, hrs. | Yield, percent | Beta-trichloro styrene, percent | |
| | Kind | percent | | | | | | |
| 1 | Butadiene | 80 | 20 | 60 | 24 | 94 | 17.5 | Soft—not tacky. |
| 2 | do | 50 | 50 | 60 | 24 | 90 | 34.0 | Soft—slightly tacky. |
| 3 | do | 40 | 60 | 60 | 24 | 92 | 45.4 | Soft—tacky. |
| 4 | do | 30 | 70 | 60 | 24 | 89 | 54.0 | very soft—tacky. |
| 5 | Isoprene | 80 | 20 | 60 | 24 | 97 | 14.2 | Soft—tacky. |
| 6 | do | 50 | 50 | 60 | 24 | 80 | 48.5 | Soft—flows. |
| 7 | Chloroprene | 70 | 30 | 60 | 24 | 94.5 | | Soft. |
| 8 | do | 60 | 40 | 60 | 24 | 86.6 | | very soft—tacky. |

These data show that the soft copolymers containing from about 34 to about 54 percent by weight of chemically combined beta-trichlorostyrene are useful for making calking compositions.

EXAMPLE 7

In each of a series of experiments a copolymer was prepared by polymerizing a mixture of monomers, including ar,ar-beta-trichlorostyrene similar to that employed in Example 2, in proportions as stated in the following table in an aqueous emulsion employing a recipe and procedures similar to those employed in Example 2. The copolymer was compounded with other ingredients to form a test composition employing the recipe and procedures described in Example 2. Table VI identifies the monomer mixture used in making the copolymer, gives the proportion of beta-trichlorostyrene chemically combined in the copolymer and gives the properties determined for the cured product.

Table VI

| Run No. | Starting materials | | | | | Copolymer | | Cured product | | | |
|---|---|---|---|---|---|---|---|---|---|---|---|
| | Butadiene, percent | Isoprene, percent | Beta-trichloro styrene, percent | Other monomer | | Yield, percent | Beta-trichloro styrene, percent | Tensile strength, lbs./sq. in. | Elongation, percent | Shore hardness | |
| | | | | Kind | Percent | | | | | A | C |
| 1 | 68 | 12 | 5 | Ethyl acrylate | 15 | 95 | 47 | 900 | 250 | 70 | 30 |
| 2 | 20 | 20 | 40 | do | 20 | 91 | 29.7 | 360 | 275 | 59 | 16 |
| | | | | Acrylonitrile | 15 | | | | | | |
| 3 | 50 | 0 | 20 | Methyl isopropenyl ketone | 15 | 100 | 16.5 | 2,160 | 300 | 72 | 34 |
| 4 | 50 | 0 | 20 | Styrene | 10 | 91 | 15.3 | 1,500 | 225 | 75 | 36 |
| | | | | Ethyl acrylate | 20 | | | | | | |

EXAMPLE 8

In each of a series of experiments a mixture of butadiene, beta-trichlorostyrene similar to that employed in Example 2, and another monomer in proportions and kind as identified in the following table was polymerized in an aqueous emulsion employing the recipe and procedure described in Example 2. Table VII identifies the copolymer by giving the proportions of the monomers from which it was prepared. The table also gives a Mooney number for the copolymer. For purpose of comparison a copolymer of styrene and butadiene was prepared in the same manner and a Mooney number determined for the binary copolymer.

Table VII

| Run No. | Starting materials | | | | Polymerizing conditions | | Copolymer | | |
|---|---|---|---|---|---|---|---|---|---|
| | Butadiene, percent | Beta-trichloro styrene, percent | Other monomer | | Temp., °C. | Time, hrs. | Yield, percent | Beta-Trichloro styrene, percent | Mooney number ML 1+4 (212° F.) |
| | | | Kind | Percent | | | | | |
| 1 | 75 | 0 | Styrene | 25 | 60 | 24 | 98.5 | 0 | 46 |
| 2 | 70.6 | 5.9 | ----do---- | 23.5 | 60 | 24 | 94 | 5.3 | 41 |
| 3 | 63.2 | 15.8 | ----do---- | 21.0 | 60 | 24 | 91.5 | 12.2 | 35.5 |
| 4 | 57.1 | 23.8 | ----do---- | 19.1 | 60 | 24 | 91 | 20.0 | 12.5 |
| 5 | 50 | 33.3 | ----do---- | 16.7 | 60 | 24 | 90 | 27.0 | 4.7 |
| 6 | 72.7 | 13.65 | Acrylonitrile | 13.65 | 60 | 24 | 87 | 10.0 | 99 |
| 7 | 59.3 | 29.6 | ----do---- | 11.1 | 60 | 24 | 86 | 22.2 | 79 |
| 8 | 66.7 | 4.7 | Methyl isopropenyl ketone | 28.6 | 60 | 24 | 90.5 | 4.4 | 36 |
| 9 | 60.9 | 13 | ----do---- | 26.1 | 60 | 24 | 93 | 9.4 | 29.5 |
| 10 | 56 | 20 | ----do---- | 24 | 60 | 24 | 93 | 16.1 | 27.5 |
| 11 | 50 | 28.6 | ----do---- | 21.4 | 60 | 24 | 92.5 | 20.2 | 7.8 |

EXAMPLE 9

In each of a series of experiments, a copolymer was prepared by polymerizing a mixture of monomers as identified in the following table and including ar,ar-beta-trichlorostyrene similar to that employed in Example 2, in an aqueous emulsion employing a recipe and procedure similar to those employed in Example 2. Table VIII identifies the monomers and gives the proportion of each employed in making the copolymer. The table gives the proportion of beta-trichlorostyrene chemically combined in the copolymer and a characteristic of the copolymer.

Table VIII

| Run No. | Starting materials | | | | Copolymer | | Remarks |
|---|---|---|---|---|---|---|---|
| | Butadiene, Percent | Beta-trichloro styrene Percent | Other monomer | | Yield, Percent | Beta-trichloro styrene, Percent | |
| | | | Kind | Percent | | | |
| 1 | 35 | 65 | Acrylonitrile | 5 | 84 | 48.3 | Soft, tacky. |
| 2 | 35 | 65 | Styrene | 5 | 84 | 48.8 | Do. |
| 3 | 35 | 65 | Dichlorostyrene | 5 | 82 | ---- | Do. |
| 4 | 35 | 65 | Ethyl acrylate | 5 | 90 | 51 | Do. |
| 5 | 35 | 65 | Ethyl vinyl ether | 5 | 75 | 50.5 | Do. |
| 6 | 35 | 65 | Vinylpropionate | 5 | 66 | 51.8 | Do. |
| 7 | 35 | 65 | Methyl isopropenyl ketone | 5 | 77 | 49 | Do. |

I claim:

1. A polymeric composition of matter comprising a copolymer selected from the group consisting of (1) copolymers containing in chemically combined form from 3 to 55 percent by weight of beta-trichlorostyrene and from 97 to 45 percent of at least one aliphatic conjugated diethylenically unsaturated organic compound having the general formula:

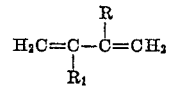

wherein R represents a member of the group consisting of hydrogen, chlorine and the methyl radical and $R_1$ represents a member of the group consisting of hydrogen and the methyl radical, and (2) copolymers containing in chemically combined form from 3 to 35 percent by weight of beta-trichlorostyrene, from 5 to 40 percent of at least one aliphatic conjugated diethylenically unsaturated organic compound having the above general formula and from 5 to 40 percent of at least one other monoethylenically unsaturated copolymerizable vinylidene compound per 100 parts by weight of the copolymer product.

2. A polymeric composition of matter comprising a copolymer containing in chemically combined form from 3 to 55 percent by weight of beta-trichlorostyrene and from 97 to 45 percent of at least one aliphatic conjugated diethylenically unsaturated organic compound having the general formula:

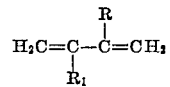

wherein R represents a member of the group consisting of hydrogen, chlorine and the methyl radical and $R_1$ represents a member of the group consisting of hydrogen and the methyl radical.

3. A composition according to claim 2, wherein the conjugated diethylenically unsaturated organic compound is butadiene.

4. A composition according to claim 2, wherein the conjugated diethylenically unsaturated organic compound is isoprene.

5. A polymeric composition of matter comprising a copolymer containing in chemically combined form from 3 to 35 percent by weight of beta-trichlorostyrene, from 5 to 40 percent of at least one aliphatic conjugated diethylenically unsaturated organic compound having the general formula:

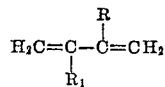

wherein R represents a member of the group consisting of hydrogen, chlorine and the methyl radical and $R_1$ represents a member of the group consisting of hydrogen and the methyl radical, and from 5 to 40 percent of at least one other monoethylenically unsaturated copolymerizable vinylidene compound per 100 parts by weight of the copolymer.

6. A composition according to claim 5, wherein the monoethylenically unsaturated vinylidene compound is a monovinyl aromatic compound.

7. A composition according to claim 5, wherein the monoethylenically unsaturated organic compound is styrene.

8. A composition according to claim 5, wherein the aliphatic conjugated diethylenically unsaturated organic compound is butadiene.

9. A composition according to claim 5, wherein the aliphatic conjugated diethylenically unsaturated organic compound is isoprene.

10. A composition according to claim 5, wherein the aliphatic conjugated diethylenically unsaturated organic compound is chloroisoprene.

11. A composition according to claim 5, wherein the monoethylenically unsaturated organic compound is methyl isopropenyl ketone.

12. A composition according to claim 5 wherein the monoethylenically unsaturated organic compound is acrylonitrile.

13. A composition according to claim 5 wherein the monoethylenically unsaturated organic compound is vinyl propionate.

14. A composition according to claim 5, wherein the monoethylenically unsaturated organic compound is ethylene glycol mono-methyl methacrylate.

15. A composition according to claim 5 wherein the monoethylenically unsaturated organic compound is 2-ethylhexyl acrylate.

16. A process for making a polymeric composition of matter comprising a copolymer selected from the group consisting of (1) copolymers containing in chemically combined form from 3 to 55 percent by weight of beta-trichlorostyrene and from 97 to 45 percent of at least one aliphatic conjugated diethylenically unsaturated organic compound having the general formula:

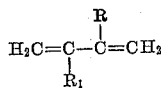

wherein R represents a member of the group consisting of hydrogen, chlorine and the methyl radical, and $R_1$ represents a member of the group consisting of hydrogen and the methyl radical, and (2) copolymers containing in chemically combined form from 3 to 35 percent by weight of beta-trichlorostyrene, from 5 to 40 percent of at least one aliphatic conjugated diethylenically unsaturated organic compound having the above general formula and from 5 to 40 percent of at least one other monoethylenically unsaturated copolymerizable vinylidene compound, per 100 parts by weight of the copolymer, which process comprises polymerizing a mixture of the monomeric ingredients in proportions corresponding to from 5 to 70 percent by weight of beta-trichlorostyrene and from 95 to 30 percent of at least one aliphatic conjugated diethylenically unsaturated organic compound having the above formula to produce the copolymer (1), and polymerizing a mixture of the monomeric ingredients in proportions corresponding to from 5 to 40 percent by weight of the beta-trichlorostyrene, from 5 to 40 percent of the aliphatic conjugated diethylenically unsaturated organic compound having the above formula and from 5 to 40 percent of the other monoethylenically unsaturated copolymerizable vinylidene compound to produce the copolymer (2), said polymerization being carried out in an aqueous emulsion at temperatures between 0° and 100° C. in the presence of a peroxy polymerization catalyst in amount corresponding to from 0.1 to 5 percent by weight of the monomers and continued until at least 70 percent by weight of the monomers are polymerized.

References Cited in the file of this patent

UNITED STATES PATENTS

| | | |
|---|---|---|
| 2,709,140 | Michalek | May 24, 1955 |
| 2,791,571 | Wheelock et al. | May 7, 1957 |
| 2,803,675 | Dreisbach et al. | Aug. 20, 1957 |
| 2,829,179 | Driesbach et al. | Apr. 1, 1958 |

FOREIGN PATENTS

| | | |
|---|---|---|
| 585,582 | Great Britain | Feb. 12, 1947 |
| 470,582 | Canada | Dec. 26, 1950 |
| 500,740 | Canada | Mar. 16, 1954 |

OTHER REFERENCES

Whitby: Synthetic Rubber, pages 963–4, John Wiley & Sons, Inc., New York, 1954.